United States Patent
McGill et al.

(10) Patent No.: US 8,949,657 B2
(45) Date of Patent: Feb. 3, 2015

(54) METHODS AND DEVICES FOR DETECTING SERVICE FAILURES AND MAINTAINING COMPUTING SERVICES USING A RESILIENT INTELLIGENT CLIENT COMPUTER

(71) Applicant: Landmark Technology Partners, Inc., Shrewsbury, NJ (US)

(72) Inventors: Robert E. McGill, Rumson, NJ (US); Igor Tsinman, Sharon, MA (US)

(73) Assignee: Landmark Technology Partners, Inc., Shrewsbury, NJ (US)

( * ) Notice: Subject to any disclaimer, the term of this patent is extended or adjusted under 35 U.S.C. 154(b) by 31 days.

(21) Appl. No.: 13/854,581

(22) Filed: Apr. 1, 2013

(65) Prior Publication Data
US 2014/0129873 A1    May 8, 2014

Related U.S. Application Data

(63) Continuation of application No. 12/860,343, filed on Aug. 20, 2010, now abandoned.

(60) Provisional application No. 61/235,464, filed on Aug. 20, 2009.

(51) Int. Cl.
*G06F 11/00* (2006.01)
*G06F 11/20* (2006.01)
*G06F 11/16* (2006.01)
*H04L 29/14* (2006.01)
*G06F 11/14* (2006.01)

(52) U.S. Cl.
CPC ........ *G06F 11/2002* (2013.01); *G06F 11/1662* (2013.01); *G06F 11/2041* (2013.01); *G06F 11/2097* (2013.01); *H04L 69/40* (2013.01); *G06F 11/1443* (2013.01); *G06F 11/1471* (2013.01); *G06F 11/2038* (2013.01); *G06F 11/2048* (2013.01)
USPC ........................................ 714/4.11; 707/649

(58) Field of Classification Search
USPC ....................................................... 714/4.11
See application file for complete search history.

(56) References Cited

U.S. PATENT DOCUMENTS

| | | | |
|---|---|---|---|
| 4,958,270 A | 9/1990 | McLaughlin et al. | |
| 5,255,388 A | 10/1993 | McLaughlin et al. | |
| 5,261,092 A | 11/1993 | McLaughlin et al. | |
| 5,426,774 A * | 6/1995 | Banerjee et al. | 714/16 |
| 6,134,673 A | 10/2000 | Chrabaszcz | |
| 6,292,905 B1 | 9/2001 | Wallach et al. | |
| 6,363,497 B1 | 3/2002 | Chrabaszcz | |
| 6,701,453 B2 * | 3/2004 | Chrabaszcz | 714/13 |

(Continued)

*Primary Examiner* — Kamini Patel
(74) *Attorney, Agent, or Firm* — J.A. Lindeman & Co., PLLC

(57) ABSTRACT

Intelligent client computing devices track and record the changes they make to data, applications, and services. Systems, devices, and computer readable media for detecting service tier failures and maintaining application services provide a resilient client architecture that allows a client application on an intelligent client to automatically detect the unavailability of server tiers or sites and re-route requests and updates to secondary sites to maintain application services at the client tier in a manner that is transparent to a user. The resilient client architecture understands the level of currentness of secondary sites in order to select the best secondary site and to automatically and transparently bring this secondary site up to date to ensure no data updates are missing from the secondary site.

26 Claims, 10 Drawing Sheets

(56) References Cited

U.S. PATENT DOCUMENTS

| | | |
|---|---|---|
| 6,981,174 B1 | 12/2005 | Hanning |
| 7,251,713 B1 * | 7/2007 | Zhang ............................ 711/162 |
| 7,437,445 B1 | 10/2008 | Roytman et al. |
| 7,447,855 B2 | 11/2008 | Suishu et al. |
| 7,925,630 B1 * | 4/2011 | Krishnamurthy et al. .... 707/649 |
| 8,166,005 B2 | 4/2012 | Bixby et al. |
| 2001/0056554 A1 | 12/2001 | Chrabaszcz |
| 2004/0158766 A1 | 8/2004 | Liccione et al. |
| 2005/0229024 A1 | 10/2005 | Findlay et al. |
| 2005/0229025 A1 | 10/2005 | Findlay et al. |
| 2005/0229026 A1 * | 10/2005 | Findlay et al. ..................... 714/4 |
| 2005/0229027 A1 | 10/2005 | Findlay et al. |
| 2005/0229028 A1 | 10/2005 | Findlay et al. |
| 2006/0005231 A1 | 1/2006 | Zuk et al. |
| 2006/0074925 A1 | 4/2006 | Bixby et al. |
| 2007/0234123 A1 * | 10/2007 | Shih et al. ........................ 714/36 |
| 2007/0244937 A1 | 10/2007 | Flynn et al. |
| 2007/0255977 A1 * | 11/2007 | Liccione et al. .................. 714/4 |
| 2008/0244035 A1 * | 10/2008 | Horie ............................ 709/217 |
| 2010/0242093 A1 * | 9/2010 | Zuk et al. ........................... 726/3 |
| 2010/0299451 A1 | 11/2010 | Yigang et al. |
| 2011/0010560 A1 * | 1/2011 | Etchegoyen .................. 713/189 |
| 2011/0047413 A1 * | 2/2011 | McGill et al. .................. 714/15 |
| 2011/0106906 A1 | 5/2011 | Assouad |

* cited by examiner

METHODS AND DEVICES FOR DETECTING SERVICE FAILURES AND MAINTAINING COMPUTING SERVICES USING A RESILIENT INTELLIGENT CLIENT COMPUTER

CROSS-REFERENCE TO RELATED APPLICATIONS

This application is a continuation application of U.S. patent application Ser. No. 12/860,343 filed on Aug. 20, 2010. This application claims priority to U.S. patent application Ser. No. 12/860,343 filed on Aug. 20, 2010, and to U.S. Provisional Patent Application No. 61/235,464, filed on Aug. 20, 2009. The entire contents of these applications are incorporated herein by reference.

TECHNOLOGICAL FIELD

This technology generally relates to client-server networks, and more particularly to systems and methods for detecting service failures on a primary site and routing requests to secondary sites to maintain application services at the client tier.

BACKGROUND

Client-server computing models include a distributed application structure that divides tasks between service providers (servers) and service requesters (clients). Clients and servers communicate over computer networks where clients request content on the servers or service functions provided by the servers. Clients initiate communication sessions with servers, which monitor incoming requests. Servers share their content or functions or computing resources with the requesting clients. Clients and servers form two tiers of a computer architecture, where the first tier, the servers, provides information based upon queries submitted by the second tier, the client application.

Servers share functions with clients such as email exchange, web access, and database access. A web browser is a client program running on a client's computer that accesses information stored on a web server on the Internet. Other users access banking services from their computers with a web browser client that sends a request to a web server at a bank. The bank program might perform additional functions on the client request such as forwarding the request to a separate database client program that sends a request to a database server at another bank computer to retrieve account information, such as an account balance. The balance information is then returned to the bank database client, which in turn serves it back to the web browser client displaying the results to the user.

The many client requests and server responses provide many points on the network where communication may be interrupted or service of the requests can fail. To reduce the frequency of communication interruptions and service request failures, a distributed service may employ data replication, where a service maintains multiple copies of data to permit local access at multiple locations, or to increase availability when a server process may have crashed. Data caching techniques, where a copy of requested data is copied and retained locally, can also be used to reduce the number and frequency of service calls made from a client to a server. For example, web browsers use document caching to speed up access to frequently used documents. Data caching is similar to data replication, but cached data can become stale when it remains on a local computer too long. Other systems employ other techniques to address communication interruptions and service failures.

Resilient computer systems are those computer systems that tolerate faults or communication interruptions or service request failures and provide an acceptable quality of service in spite of the interruptions. Resilient computer systems can withstand service interruptions without permanently failing. Resilient systems recover from service interruptions and make adjustments to continue to provide service.

In order to recover quickly or provide service alternatives, a resilient computer system or computer application needs to recognize the temporary loss of communication connection between the client and the server. The client application must be aware that the connection will be temporarily unavailable and must retry access rather than ending or initiating a failover. Similarly, server applications need to be aware that the communication connection is no longer available. Different approaches have been used in the past to provide resilient computer systems that provide persistent service delivery and can justifiably be trusted when servicing user requests.

SUMMARY

One example of the claimed invention is a resilient client architecture that allows a client application to automatically detect service failures on a server tier and/or a complete site failure at the server tier and re-route requests and updates to secondary sites to maintain application services at the client tier transparently to a user. In addition, the resilient client architecture employed is able to understand the level of currentness of secondary sites in order to select the best secondary site to which requests are to be sent and to automatically and transparently bring this secondary site up to date so that no data updates are missing from the secondary site. The resilient client architecture can be used to recover from a site failure, from a server failure, and/or from a service failure. For example, a site can include multiple servers. The servers, in turn, can each be providing multiple services to a client or clients. The resilient client architecture of the intelligent client keeps track of updates the client makes to data representing requested resources, such as particular web page(s), image(s) of physical objects, business objects, database fields, application processes, and other objects that can be provided by a server in response to client requests. The resilient client architecture tracks and stores changes that the client makes to the data, so that in the event of a service failure, a server failure, or a site failure, the changes to the data may be replayed to at least one of a secondary service, a secondary server, or a secondary site. Regardless of the point of failure, the resilient client architecture provides a process to replay data updates to the particular point of failure regardless of whether the failure occurred at the service level, the server level, or the site level.

In this disclosure, many of the examples discuss secondary sites used to provide failover synchronization to a client computer. However, it should be understood that secondary services and secondary servers in accordance with the claimed invention can also provide failover synchronization to a client computer, depending upon where the particular point of failure occurs. Additionally, the secondary services and secondary servers can reside and/or be provided by the same physical computing device as the primary services and primary servers or can reside and/or be provided by a physically separate computing device.

In another example implementation, the secondary sites are used to provide application services to clients to offload the primary site and to provide scalability to applications in addition to redundancy. For example, the secondary sites can be used to balance the workload across servers or across clusters of servers.

One example in the following disclosure is a resilient client failover synchronization algorithm and architecture. When a communication interruption occurs, and the service of a client request is provided by a secondary server site, the client must assess the "current-ness" of the data on the secondary server site. "Current-ness" is a measure of the amount of time the data has been on the secondary server site. For example, data stored on the secondary server five minutes ago is more current than data stored on the secondary server one hour ago. The currentness of the data is a function of the frequency in which data is offloaded from a primary site to a secondary site. In one example system below, the frequency in which data is offloaded can be established using a heartbeat signal from the primary site to the secondary site, which establishes a regular time frame to store and forward data from the primary site to the secondary site. For example, data can be stored and forwarded from the primary site to the secondary site every five minutes, every five milliseconds, or at other regular intervals.

In one example, the resilient client architecture with failover synchronization operates in a networked system that includes at least one intelligent client computer device, a primary site, and at least one secondary site. The client computer can include a client object factory, a transaction log, an application services routing table, and a console. The intelligent client computer device communicates over a computer network and requests content and/or services from the primary site. The primary site can monitor incoming requests and share its content or functions or computing resources with the requesting intelligent client computing device. The primary site can include a web server, an application server, and a database server. The primary site can also include a transaction log, an application services routing table, and a console as well. The servers can be synchronous or asynchronous, or a combination of synchronous and asynchronous. For example, communication events can be synchronous events, and deferred events can be asynchronous and can be handled by an appropriate server.

The intelligent client computer can be configured with the resilient client architecture to carry out the failover synchronization methods described below. Alternatively, the primary and/or secondary site(s) can also be configured to operate in conjunction with the intelligent client computer to perform the failover synchronization methods described below. Of course, a combination of the intelligent client computer, the primary site, and/or the secondary site(s) can also be configured to carry out the failover synchronization methods described.

In one example, the client server system automatically detects service tier service failures and reroutes client requests and updates to secondary service nodes at the primary site or at secondary sites to maintain application services. The client server system determines the level of currentness of secondary sites and updates the secondary sites accordingly.

In another example, the client server system automatically detects service tier service failures, but when the client determines that the secondary service is less current than the primary service, the client server system automatically updates the secondary service with updates from the client's local transaction log to bring the secondary service up to date. The client server system then reroutes client requests to up-to-date secondary service nodes.

Similarly, in another example, the client server system automatically detects service tier service failures, but the client employs an application service routing table to determine primary and eligible secondary service locations. The client server system then reroutes client requests and updates to the service location determined by the application service routing table when a primary service tier failure occurs.

Additionally, in another example, the client server system automatically detects service tier service failures. Upon detection of the service tier failure, the client retries the primary site a parameter driven number of times. After retrying the primary site the number of times specified by the defined parameter, the client reroutes client requests to the secondary site. The parameter specifying the number of times to retry can be defined by a user or it can be determined by the number and nature of the client request, the network configuration, the transmission parameters, and the like.

In one example, the client server system automatically detects service tier failures, and the client notifies a master console whenever a server tier service is unavailable. The master console can be included in the intelligent client, in a primary site, in a secondary site, or as a separate computing device. Additionally, the master console can replicate data used when a server tier service is unavailable to other intelligent clients, primary sites, and/or secondary sites. This master console is accessed when sessions are initiated to determine the sites that are available at the time of session initiation. The available sites can then be used as destinations to receive rerouted client requests in the event of a service tier failure.

In each of the examples, the client can be run inside of a web browser or outside of a web browser, such as by a web server in a private network. In all these environments, information and computing resources can be accessed by a software application and retrieved and presented. Information resources, including the primary and secondary sites, can be traversed regardless of whether the software application is a web browser or other application. Additionally, the techniques and processes described in the examples can also be performed when clients are connected to multiple sites that are synchronized automatically.

One computer-implemented resilient client failover method to maintain an up-to-date shared application service uses an intelligent client computer to determine a level of currentness of a primary site. The intelligent client computer detects that the primary site is unavailable and assesses a level of currentness of a secondary site. In detecting that the primary site is unavailable, the intelligent client computer can detect at least one of a service tier failure, an application tier failure, or a database failure, for example. The intelligent client computer determines updates made by the intelligent client computer to data for updating the primary site and replays the updates to the data made by the intelligent client computer to the secondary site.

Additionally, the method can include establishing a time standard between the primary site and the secondary site to determine the data currentness of the secondary site. The primary site can include at least one of a web server, an application server, or a database server. Similarly, the secondary site can also include at least one of a web server, an application server, or a database server. Further, in performing the method, the updates to data can include at least one of a client request, an application service request, or an update to a data field.

In assessing the data currentness of the secondary site, the failover method can include determining the most recent time synchronization of the secondary site. Also, the data currentness can be determined by the date and time of a most recent successful update to a persistent data store on the primary site.

In performing methods of the claimed invention, the primary site and the secondary site can reside in the same computing device, or the primary site and the secondary site can reside in separate computing devices.

In addition, one method of the claimed invention can also include storing the updates to data made by the intelligent client in a transaction log of the intelligent client. The updates replayed to the secondary site are performed prior to posting transactions or performing read operations on the secondary site. Additionally, replaying the updates to the secondary site can further include tracking the updates in an application service routing table of the intelligent client to determine the primary site and at least one eligible secondary site and rerouting client updates to a secondary site. The secondary site receiving the rerouted client updates can be selected based upon a number of factors, such as data currentness of eligible secondary sites, network traffic characteristics, network capacity, and the like.

The method of the claimed invention can also include the intelligent client computer requesting transaction services from a client object factory. The client object factory can serialize updates made by the intelligent computer to the data for updating the primary site as a transaction, and the updates can be stored as the transaction in a transaction log. The transaction can then be replayed to the secondary site when the intelligent client computer determines that the primary site is unavailable.

In one example, a method for automatically detecting service tier failures and rerouting client requests and updates to secondary sites maintains application services on a client server network system. The method determines the level of currentness of secondary sites and updates the secondary sites accordingly.

In one example, a computer readable medium has instructions stored on it for automatically detecting service tier failures and rerouting client requests and updates to secondary sites to maintain application services on a client server network system. A computer readable medium of the claimed invention includes instructions stored on it to cause at least one processor to perform steps of the failover method described above. For example, one computer readable storage media for maintaining an up-to-date shared application service includes one or more computer-readable instructions configured to cause one or more computer processors to execute operations including using an intelligent client computer to determine a level of currentness of a primary site and detecting that the primary site is unavailable. The computer readable storage media further includes one or more computer-readable instructions configured to cause one or more computer processors to execute operations including using the intelligent client computer to assess a level of currentness of a secondary site and to determine updates made by the intelligent client computer to data for updating the primary site. Additionally, the computer readable storage media includes one or more computer-readable instructions configured to cause one or more computer processors to execute operations including using the intelligent client computer to replay the updates to the data made by the intelligent client computer to the secondary site.

The computer readable storage media of the claimed invention can further include computer-readable instructions configured to cause one or more computer processors to execute operations including storing the updates to data made by the intelligent client in a transaction log of the intelligent client. Further, these instructions can be configured to cause one or more computer processors to execute the operations for replaying the updates to the secondary site by tracking the updates in an application service routing table of the intelligent client to determine the primary site and at least one eligible secondary site and rerouting client updates to a secondary site.

The computer readable storage media of the claimed invention can further include computer-readable instructions configured to cause one or more computer processors to execute operations including detecting a service tier failure, an application tier failure, and/or a database failure when detecting that the primary site is unavailable.

The computer readable storage media of the claimed invention can also include computer-readable instructions configured to cause one or more computer processors to execute operations including requesting transaction services from a client object factory using the intelligent client computer and serializing the updates made by the intelligent client computer to data for updating the primary site as a transaction with the client object factory. Additionally, the stored instructions can be configured to cause a processor to execute operations including storing the updates made by the intelligent client computer as the transaction in a transaction log. The computer readable storage media can also include computer-readable instructions configured to cause one or more computer processors to execute the operation of replaying the transaction to the secondary site when the intelligent client computer determines that the primary site is unavailable.

When executed by at least one processor, the instructions on the computer readable medium cause a processor to automatically detect service tier failures and reroute client requests and updates to secondary sites and maintain application services on a client server network system. The instructions on the computer readable medium further cause the processor to perform steps including determining the level of currentness of secondary services on primary sites and secondary sites and updating the secondary sites accordingly.

These and other advantages, aspects, and features will become more apparent from the following detailed description when viewed in conjunction with the accompanying drawings. Non-limiting and non-exhaustive embodiments are described with reference to the following drawings. Accordingly, the drawings and descriptions below are to be regarded as illustrative in nature, and not as restrictive.

DETAILED DESCRIPTION

When a primary network system component, such as a server, database, or other network device fails or is otherwise shut down, a backup operation can be implemented to automatically switch the other network devices to a secondary database, server or network. This backup operation is often termed a "failover" operation. For example, when a network device fails, the rest of the network switches over to a secondary device. Failover is an important fault tolerance function of networks that rely on constant accessibility. The degree to which failover operations successfully, automatically, and transparently (to the user) redirect requests from the failed or unavailable primary device or system to the secondary device or system and mimic the operations of the primary device or system is a measure of the robustness of the communications network.

For example, a web server or application server, or application software component can crash and stop providing services to clients with or without a hardware or device failure. In this case, client requests must be handled by a different service provider running on the same or different hardware.

Figure 1:
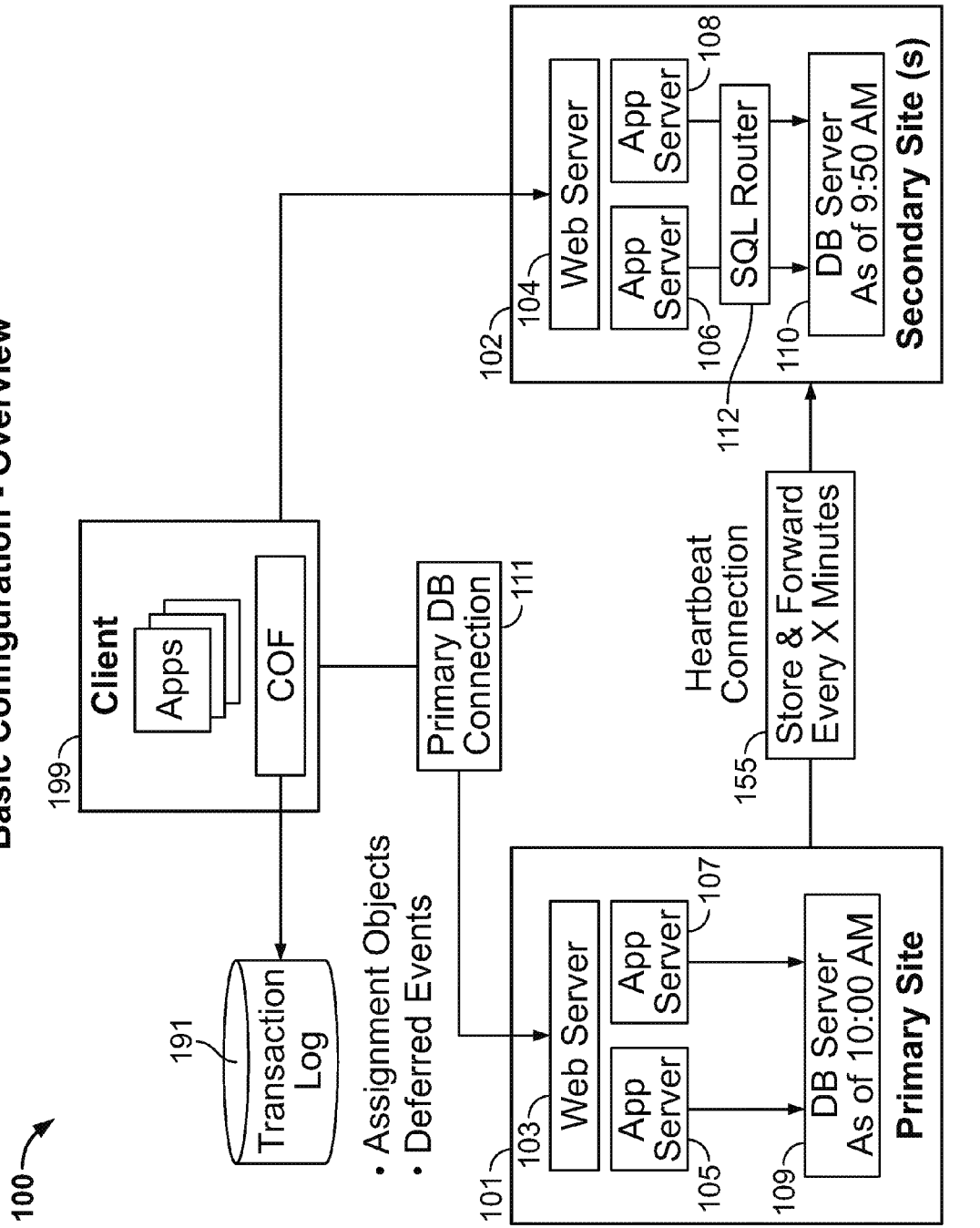
FIG. 1 is an example resilient client architecture system with failover synchronization.

FIG. 1 is an exemplary client-server network 100 that that provides failover synchronization between primary site 101, secondary site 102, and client 199. The primary database connection 111 is between client 199 and primary site 101. In order to best mimic operations of the primary site 101, secondary site 102 must have data that is the same as that on the primary site 101. In the following examples, the primary site and secondary site(s) can include one or more servers and/or one or more shared application services.

The client computer 199 in this example can run interface applications such as web browsers and others that can provide an interface to make requests for (and send data to) different web server-based applications via the network system 100. A series of applications and services can run on the primary site 101 and secondary site 102 that allow the transmission of data requested by the client computers 199. The primary site 101 and secondary site 102 can provide data or receive data in response to requests directed toward the respective applications on the respective sites from the client computers 199. In accordance with the transmission control protocol (TCP), packets can be sent to the primary site 101 and secondary site 102 from the requesting client computers 199. The packets from the client computers 199 can include requests for the sites 101, 102 to send data. It is to be understood that the primary site 101 and secondary sites 102 can be hardware or software or can represent a site with a single server or with multiple servers, which can include internal or external networks. Further, additional sites and servers can be coupled to the network system 100, and many different types of applications can be available on sites coupled to the system 100.

Generally, client devices such as the client computers 199 can include any computing device capable of connecting to another computing device to send and receive information, including web-based information. The set of such devices can include devices that typically connect using a wired and/or a wireless communications medium, such as personal computers, desktops, laptops, mobile phones and/or smart phones, and the like. In these examples, the client devices can run web browsers that can provide an interface to make requests to different web server-based applications via the network system 100. A series of web-based applications can run on the primary site 101 and secondary site 102 that allow the transmission of data requested by the client computers 199. The client computers 199 can be further configured to engage in a secure communication with other devices and/or the sites 101, 102 using mechanisms such as Secure Sockets Layer (SSL), Internet Protocol Security (IPSec), Tunnel Layer Security (TLS), and the like.

In one example, the network system 100 includes client computer 199, although the network system 100 can include other types of private and public networks that include other devices. Communications, such as requests from client computers 199 and responses from sites 101, 102 take place over the network system 100 according to standard network protocols, such as the HTTP and TCP/IP protocols, but the principles discussed are not limited to this example and can include other protocols. Further, the network system 100 can include local area networks (LANs), wide area networks (WANs), direct connections and any combination thereof, other types and numbers of network types. On an interconnected set of LANs or other networks, including those based on different architectures and protocols, routers, switches, hubs, gateways, bridges, and other intermediate network devices can act as links within and between LANs and other networks to enable messages and other data to be sent from and to network devices. Also, communication links within and between LANs and other networks typically include twisted wire pair (e.g., Ethernet), coaxial cable, analog telephone lines, full or fractional dedicated digital lines including T1, T2, T3, and T4, Integrated Services Digital Networks (ISDNs), Digital Subscriber Lines (DSLs), wireless links including satellite links and other communications links known to those skilled in the relevant arts. In essence, the network system 100 includes any communication medium and method by which data can travel between client devices 199 and sites 101, 102 and these example configurations are provided by way of example only.

Each of the servers, sites 101, 102, and client computers 199 can include a central processing unit (CPU), controller or processor, a memory, and an interface system which are coupled together by a bus or other link, although other numbers and types of each of the components and other configurations and locations for the components can be used.

Figure 10:
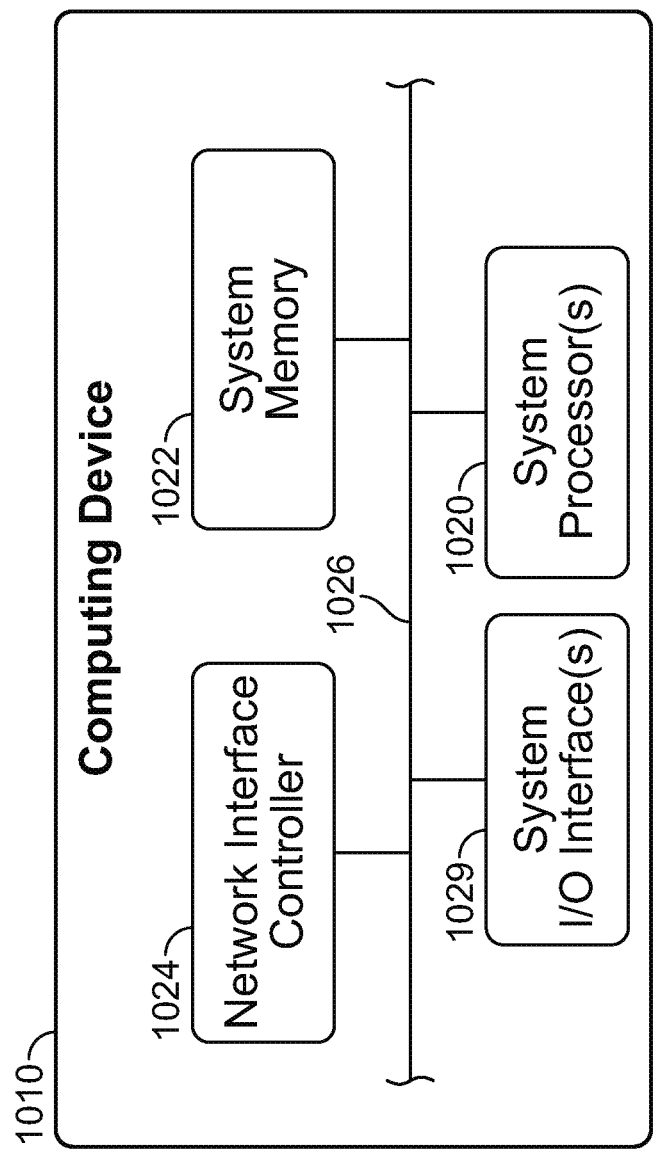
FIG. 10 is a block diagram of an example client/server computer device in the system.

As shown further in FIG. 10, the client computers and server computers (herein "resilient computing devices") shown as reference numeral 1010 described in these examples include system processor(s) 1020, system memory 1022, system I/O interface(s) 1029, and network interface controller 1024, which are coupled together by a bus 1026 or other numbers and types of links, although the resilient computing devices 1010 can include other components and elements in other configurations. In this example, the resilient computing device 1010 is implemented as a standalone device, although the resilient computing device 1010 could be implemented as a blade device in a chassis-blade implementation, for example.

System processor 1020 includes one or more microprocessors configured to execute computer/machine readable and executable instructions stored in system memory 1022 to implement automatic detection of service tier failures and rerouting client requests and updates to secondary sites to maintain application services on a client server network system, such as network system 100, for example. When executed by at least one processor, the instructions stored in system memory 1022 cause the processor 1020 to automatically detect service tier failures and reroute client requests and updates to secondary sites and/or to secondary services on the primary site, and maintain application services on a client server network system. The instructions on the computer readable medium, including system memory 1022, further cause the processor 1020 to perform steps including determining the level of currentness of secondary sites 102 and/or secondary services on the primary site and updating the secondary sites 102 and services accordingly.

The system processor 1020 is configured to execute computer/machine readable and executable instructions stored in system memory 1022 to implement one or more portions of the processes described further below in connection with FIGS. 1-9, for example, although processor 1020 can comprise other types and/or combinations of processors, such as digital signal processors, micro-controllers, switch chips, bus controllers, application specific integrated circuits ("ASICs"), programmable logic devices ("PLDs"), field programmable logic devices ("FPLDs"), field programmable gate arrays ("FPGAs"), and the like, programmed or configured according to the teachings as described and illustrated herein with respect to FIGS. 1-9.

System memory 1022 comprises computer readable media, namely computer readable or processor readable storage media, which are examples of machine-readable storage media. Computer readable storage/machine-readable storage media can include volatile, nonvolatile, removable, and non-removable media implemented in any method or technology for storage of information, such as computer readable/machine-executable instructions, data structures, program modules, or other data, which can be obtained and/or executed by one or more processors, such as system processor 1020, to perform actions, including implementing an operating system for controlling the general operation of resilient computing device 1010 to automatically detect service tier failures and reroute client requests and updates in accordance with the processes described further below in connection with FIGS. 1-9, for example.

Examples of computer readable storage media include RAM, BIOS, ROM, EEPROM, flash/firmware memory or other memory technology, CD-ROM, digital versatile disks (DVD) or other optical storage, magnetic cassettes, magnetic tape, magnetic disk storage or other magnetic storage devices, or any other medium which can be used to store the desired information, including data and/or computer-executable instructions or other machine-executable instructions, and which can be accessed by a computing or specially programmed device, such as resilient computing device 1010. When the instructions stored in system memory 1022 are run by the system processor 1020, the resilient computing device 1010 implements at least a portion of the processes described further below to detect service tier failures and maintain application services in connection with FIGS. 1-9, in addition to the various client-server management related functions, including redundancy functions, version controls, server load balancing functions, device configuration functions (e.g., defining network security policies), VPN hosting, network traffic management, loss control, and other functions.

System I/O interface(s) 1029 includes one or more user input and output device interface mechanisms, such as a computer keyboard, mouse, display device, and the corresponding physical ports and underlying supporting hardware and software to enable the resilient computing device 1010 to communicate with the outside environment for accepting user data input and to provide user output, although other types and numbers of user input and output devices can be used. Alternatively or in addition, as will be described in connection with network interface controller 1024 below, the resilient computing device 1010 can communicate with the outside environment for certain types of operations (e.g., configuration) via a network management port, for example.

Network interface controller 1024 provides physical access to a networking medium and provides a low-level addressing system, which enables the resilient computing device 1010 to engage in TCP/IP communications over network system 100 (shown in FIG. 1) and to automatically detect service tier failures and reroute client requests and updates to secondary sites and/or to secondary services on the primary site to maintain application services although the network interface controller 1024 can be constructed for use with other communication protocols and types of networks, and can include other components, and can perform other functions. Network interface controller 1024 is sometimes referred to as a transceiver, transceiving device, or network interface card (NIC), which transmits and receives network data packets to one or more networks, such as network system 100 in this example. When the resilient computing device 1010 includes more than one system processor 1020 (or a processor 1020 has more than one core), each processor 1020 (and/or core) can use the same single network interface controller 1024 or a plurality of network interface controllers 1024. Further, the network interface controller 1024 can include one or more physical ports, such as Ethernet ports, to couple the resilient computing device 1010 with other network devices, such as servers and other sites. Additionally, the network interface controller 1024 can include certain physical ports dedicated to receiving and/or transmitting certain types of network data, such as device management related data for configuring the resilient computing device 1010.

In one example, the network interface unit 1024 is an FPGA that can include a local memory and be configured with logic to implement one or more aspects of the technology, including by way of example only, automatically detecting service tier failures and rerouting client requests and updates to secondary sites or secondary services on the primary site to maintain application services, although the network interface unit 1024 can include other types of configurable hardware, such as digital signal processors, micro-controllers, ASICs, PLDs, FPLDs, and the like, programmed or configured according to the teachings as described and illustrated herein with respect to FIGS. 1-9, as well as software executed by the system processor 1020, combinations thereof, and other components and elements configured in other manners which could implement one or more aspects of the technology. The use of specialized hardware in this example allows the network interface unit 1024 to rapidly process network data packets.

Bus 1026 includes at least one internal device component communication bus, link, bridge and supporting components, such as bus controllers and/or arbiters. These devices enable the various components of the resilient computing device 1010, such as the system processor 1020, system memory 1022, system I/O interface 1029, and network interface controller 1024, to communicate, although the bus 1026 can enable one or more components of the resilient computing device 1010 to communicate with components in other devices as well. By way of example only, example buses include HyperTransport, PCI, PCI Express, InfiniBand, USB, Firewire, Serial ATA (SATA), SCSI, IDE and AGP buses, although other types and numbers of buses can be used, and the particular types and arrangement of buses will depend on the particular configuration of resilient computing device 1010.

While each of the servers, sites 101, 102, and client computers 199 can include the processor 1020, memory 1022, network interface controller 1024, and I/O interface 1029 coupled together by a bus 1026, two or more computing systems or devices can be substituted for any one of the devices in the system 100. Accordingly, principles and advantages of distributed processing, such as redundancy, replication, and the like, also can be implemented as desired to increase the robustness and performance of the devices and systems of the system 100. The system 100 can also be implemented on a computer system or systems that extend across any network environment using any suitable interface mechanisms and communications technologies including, for example telecommunications in any suitable form (e.g., voice, modem, and the like), Public Switched Telephone Network (PSTNs), Packet Data Networks (PDNs), the Internet, intranets, a combination thereof, and the like.

For clarity and brevity, in FIG. 1 a single secondary site 102 is shown connected to primary site 101 via heartbeat connection 155, but it should be understood that any number of secondary sites can be employed in the exemplary network 100. Likewise, a single client 199 is shown in FIG. 1, but any number of client devices can also use the exemplary network 100 as well. In the examples discussed, client devices are referred to by reference numeral 199 and secondary sites are referred to by reference numeral 102. Similarly, in the examples that follow, secondary sites 102 are shown, but the methods, devices, and systems shown also apply to secondary services that may be provided by, or located on, the primary site. For brevity, secondary sites 102 are called out, but it should be understood that secondary services on the primary site are also included.

Primary site 101 and secondary site 102 include databases and servers that include one or more computing machines capable of operating one or more web-based or network based applications that can be accessed by network devices in the network system 100. Client device 199 is an example of a computing machine and can provide other data representing requested resources, such as particular web page(s), image(s) of physical objects, business objects, and any other objects, responsive to the requests, although the servers can perform other tasks and provide other types of resources. It should be noted that while only four servers 103, 105, 107, 109 are shown in the primary site 101 depicted in FIG. 1, other numbers and types of servers can be coupled to the primary site 101 and network system 100. It is also contemplated that one or more of the servers 103, 105, 107, 109 can be a cluster of servers managed on the network system 100.

As detailed below, the primary site 101 and secondary site 102 can receive packets from clients 199 that can include data requested for server applications running on primary site 101 and secondary site 102. The requested packets can be routed from the client computers 199 to the primary site 101 and secondary site 102 via network system 100.

In order to provide an effective fail over response or to provide scalability to applications across multiple sites, the data on the secondary site 102 must be current (or nearly current) with respect to primary site 101. An SQL Router 112 can be used to make a group of database replicas spread across multiple secondary sites 102 appear to the application as a single database 110. The SQL router 112 can switch to a new database (not shown) when an existing database 102 is no longer available, can balance the network system 100 load by spreading connections across several copies, and can partition the data by selecting a database server from among multiple secondary sites 102.

To establish a manner of synchronizing the primary and secondary sites 101, 102, a time standard is established between the primary and secondary sites 101, 102. A network time protocol (NTP) server (not shown separately) synchronizes the clocks of the computers on the network 100. For example, primary site 101 and/or secondary site 102 can include an NTP server to establish a time synch between the client 199, primary site 101, and secondary site 102 by using an NTP server as one or more of web servers 103, 104, application servers 105, 106, 107, 108, or database servers 109, 110, or as another server connected to the same network system 100.

Applications route to primary data stores on the primary site 101 but fail over automatically to secondary data stores when the primary data store is not available. When failing over to the secondary site 102, the client 199 must assess the data currency of the secondary site 102 and "replay" updates that have occurred since the most recent time synchronization of the secondary site 102. The client 199 is an intelligent device in that the client 199 knows which updates have been made in a particular session. Updates are logged and tracked in transaction log 191 on the client 199. The transaction log 191 logs and tracks "what" has been changed in a particular session. The replays provide a resource-efficient series of snapshots of data that have changed. Using replays saves disk storage space and decreases data transmission times. Replays provide the incremental changed data rather than entire files or larger stores of information. The replay of the updates is performed prior to posting any transactions or performing any read operations. Otherwise, these operations may be performed using data that is not current.

In FIG. 1, the web server 103 maintains "currentness" time for the site 101 as a whole. The currentness time is determined by the date/time of the last successful update to the persistent data store (DB server 109) on the site 101. The currentness time can be used by the client as one measure in determining the "best" secondary site is to failover to in a multi site scenario. For example, if there are five "secondary" sites 102, each may be assessed as to how often it is updated. For example, one secondary site is updated only nightly through batch file transfer, another secondary site is updated every 30 minutes via store and forward of change logs at the database level, and a third secondary site is updated essentially in real time through the use of a SQL router. The client 199 can "choose" the best secondary site to route transactions to when its primary site fails via this published currentness value. If the client 199 is running on the primary site 101, with primary database 109, the primary site is current. However, if the client 199 is connected to the secondary site 102 with secondary database 110, then the secondary site 102 inherits the time synchronization of the secondary database 110.

Of course additional measures can be used to determine the best secondary site to fail over to. The client 199 can use network traffic characteristics such as connectivity, one-way delay and loss, round-trip delay, delay variation, loss patterns, packet reordering, bulk transport capacity, link bandwidth capacity, packet duplication and network capacity metrics with which to select a secondary site to fail over to. These metrics can be determined and stored using a routing table (not shown separately) in client 199. The routing table logs and tracks "where" changes made by an intelligent client in a particular session have been sent.

Figure 2:
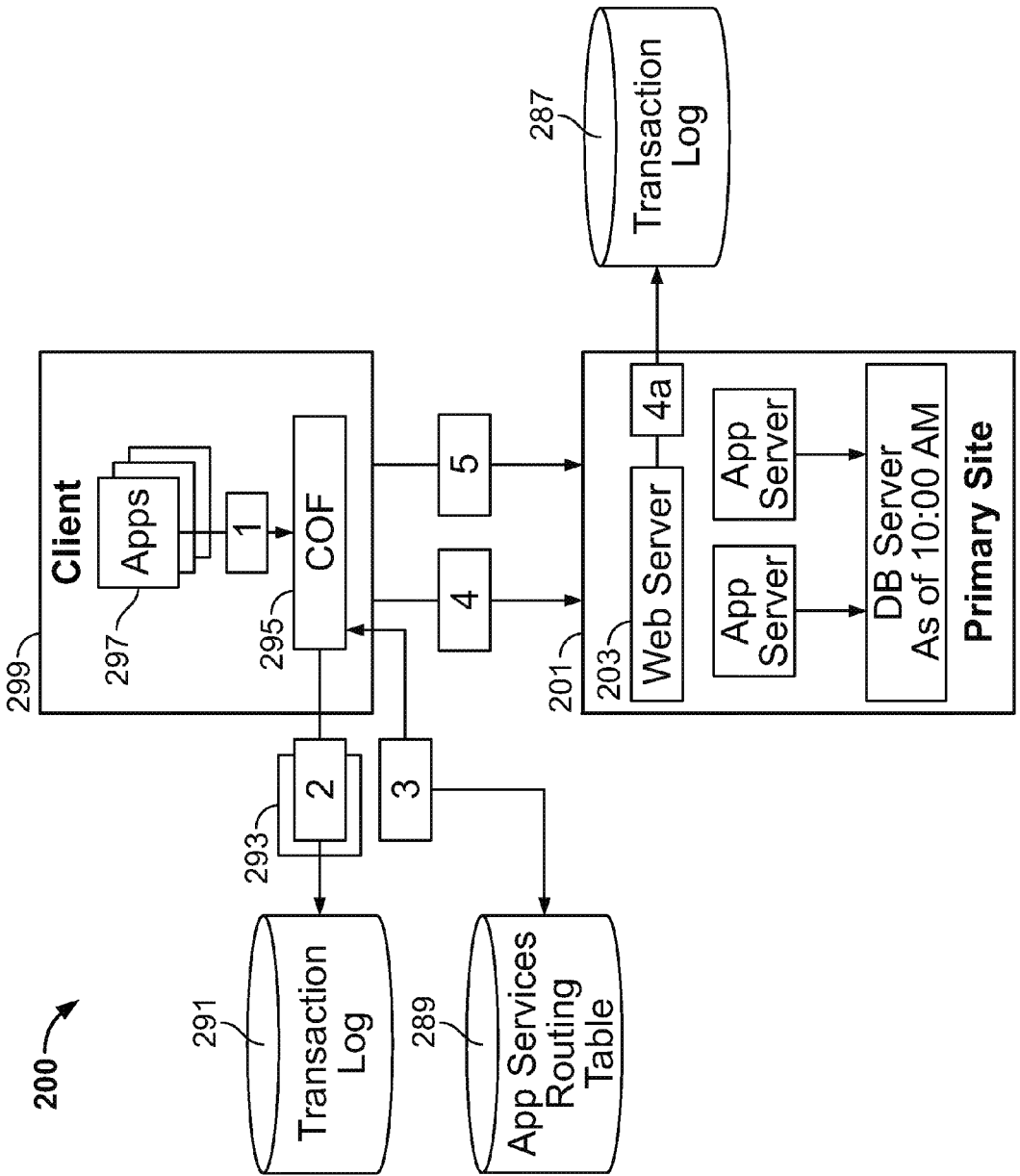
FIG. 2 illustrates an example of resilient client architecture system with transaction routing and logging.

To perform the synchronization, transaction routing and logging is performed by networked system 200 as shown in FIG. 2. FIG. 2 includes reference elements 1-5 which represent the flow of information between the components of networked system 200. For example, in client 299, client application process (Apps 297) requests transaction services in block 1 from Client Object Factory (COF) 295. COF 295 is a software program or hardware device that renders services to client 299 necessary for the resilience features described, such as transaction logging and transaction routing. COF 295 can be used to create objects more simply than obtaining an object of a particular kind. In any event, in block 2, the COF 295 serializes the contents of a transaction cache (not shown separately) and then posts a completed communication event (transaction 293) to the client side transaction log 291. The COF 295 takes just the changes made to data and sends them to the transaction log 291. In this fashion, the client 199 can identify exactly what updates are needed to go to the secondary site 102. The Client Object Factory transaction log 291 keeps track of the changes. The transaction 293 can be posted to the transaction log 291 in memory, or the transaction 293 can be persisted depending on whether a browser is deployed or if the client 299 is using a disconnected version of software which allows persistence of application data between sessions.

In block 3, the COF 295 maintains the address of the primary site 201 by checking in internal application services routing table 289, which lists the primary site 201 and available secondary sites (not shown in FIG. 2). In block 4, the COF 295 sends the serialized transaction 293 to the IP address resolved from the app services routing table 289 and waits for a response. App services routing table 289 can include the transaction type, the site being used, such as primary site 201 or secondary site(s) (not shown in FIG. 2), and the on-line or off-line status of the sites as well as the resolved IP address of the site. In this example, the IP address resolved from the app services routing table 289 corresponds to primary site 201. When the serialized transaction 293 is received at primary site 201, the web server 203 component of the primary site 201 posts a copy of the transaction 293 to a server side transaction log 287 in block 4a. As the transfers proceed, in block 5 the COF 295 issues a regularly scheduled heartbeat message which, among other things, refreshes updates to the app services routing table 289.

Figure 3:
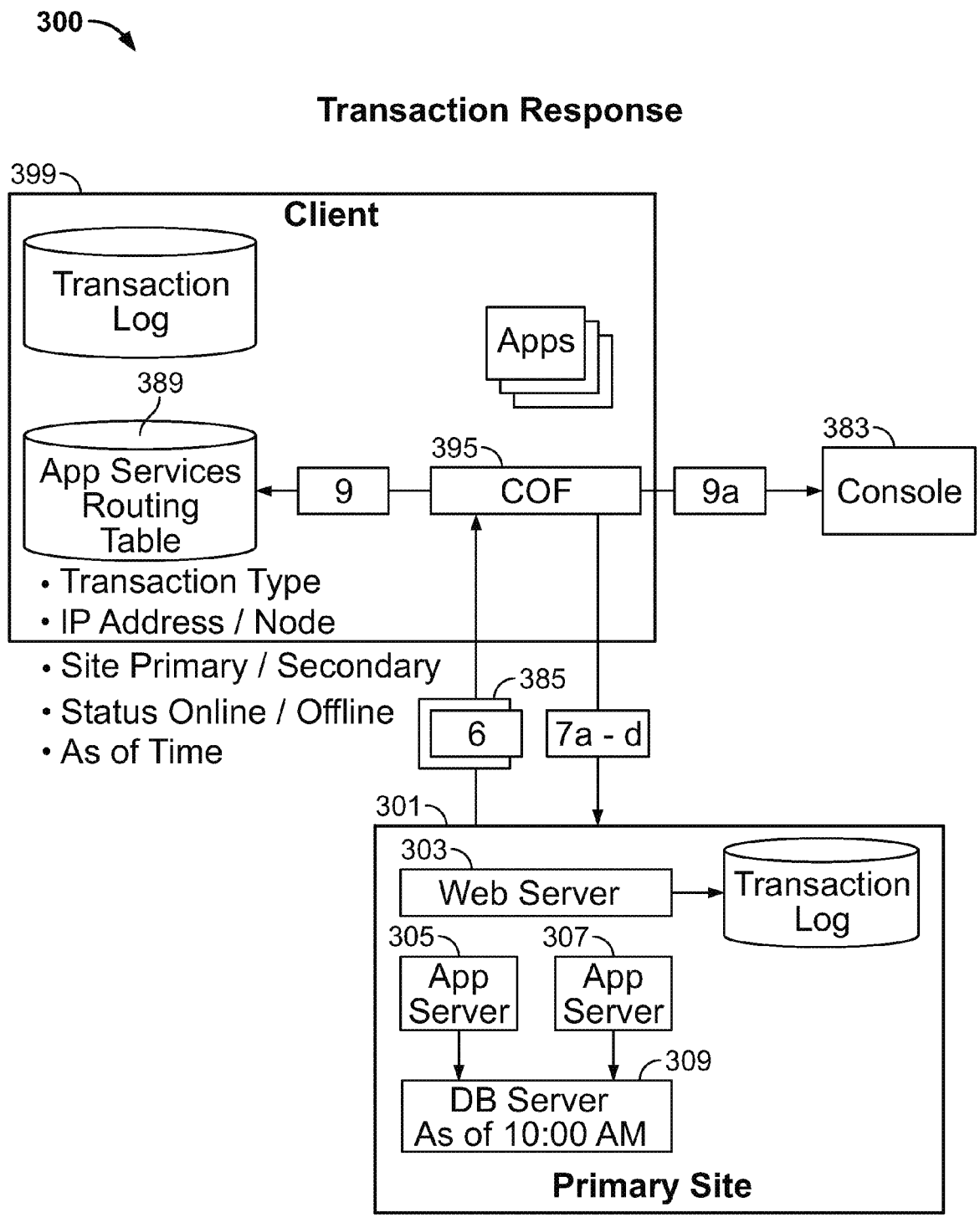
FIG. 3 shows an example resilient client architecture system with transaction response.

The process continues in FIG. 3, where the transaction response is serviced by networked system 300. In processing a transaction request, client 399 initiates a transfer with primary site 301. In block 6, the COF 395 either receives a transaction response 385 from primary site 301 within a specified time window or it does not receive a response within the time window. If COF 395 receives a transaction response 385, COF 395 delivers the transaction response 385 to the requesting application. For example, the COF 395 can make requests using an HTTP/S request response model. When a response is received, it is delivered to the proper listener (not shown separately) on the client. The listener application can run on the client and listen for and accept client connections. For example, when a user updates a customer record, a request to do is sent to the primary site 301 and when successful, primary site 301 returns a response indicating a successful update. While the application is waiting an hourglass can be displayed, and the application listens for a response. When a response is received, it is processed by the COF, which notifies the application which then closes the window and removes the hourglass. If no transaction response 385 is received from the requesting application, and the retry counter is less than a configurable maximum number of tries, the web server 303 is probed for diagnostic reasons for the lack of response and to confirm that a service interruption has occurred. For example, in block 7a, the COF 395 pings the server 303 to determine if it is reachable. Additionally, in block 7b, the COF 395 sends a web request to assess if the web tier (for example, web server 303) is responding. Further, in block 7c, the COF 395 sends an app request to assess if the app tier (for example, app servers 305, 307) is responding. Similarly, in block 7d, the COF 395 sends a dB request to assess if the db tier (for example, dB server 309) is responding. If all four queries in blocks 7a-d are successful, then the client 399 loops back to block 6, increments the retry counter, and the COF 395 continues to attempt to receive a response from the requesting application.

If one or more of the four queries in blocks 7a-7d fails, then the app services routing table 389 is updated for that transaction in block 9. In block 9a, a notification message is issued to a control console 383, and the message is resent to the next IP address on the app services routing table 389. That is, the transaction is resent. The heartbeat messages between client and server tiers (see block 5 in FIG. 2, for example) are running in a different thread, and they will be re-established with the secondary site once the primary site 301 is determined to have failed. For example, when the heartbeat runs every 30 seconds, once a transaction is rerouted to a secondary site and the app services routing table 389 is marked indicating that the primary site 301 is unavailable, the heartbeat thread will run down the application services routing table 389 in the same fashion as the transaction, find a new site to "heartbeat" with and initiate heartbeat communications with that secondary site. For example, if primary site 301 does not respond, the COF 395 will attempt to deliver the transaction (not shown in FIG. 3) to a secondary site (not shown in FIG. 3), which is the next IP address on the app services routing table 389. Additionally, the networked system 300 may be set up to mark all transactions as offline for an IP address that fails to respond to the pings (block 7a) or web tier probes (block 7b). If only the app request (block 7c) fails, then only the application requests, known as communication events (CEs), related to that app request (synch/asynch) are marked as offline or unavailable. The layers of services running on the server tier and failures at different layers can be set to failover in different fashions. For example, when an app server fails, the system can route to a different app server instance running on the same physical server. But if a database server fails and there is no local failover copy, then the failover goes all the way to a secondary site.

Figure 4:
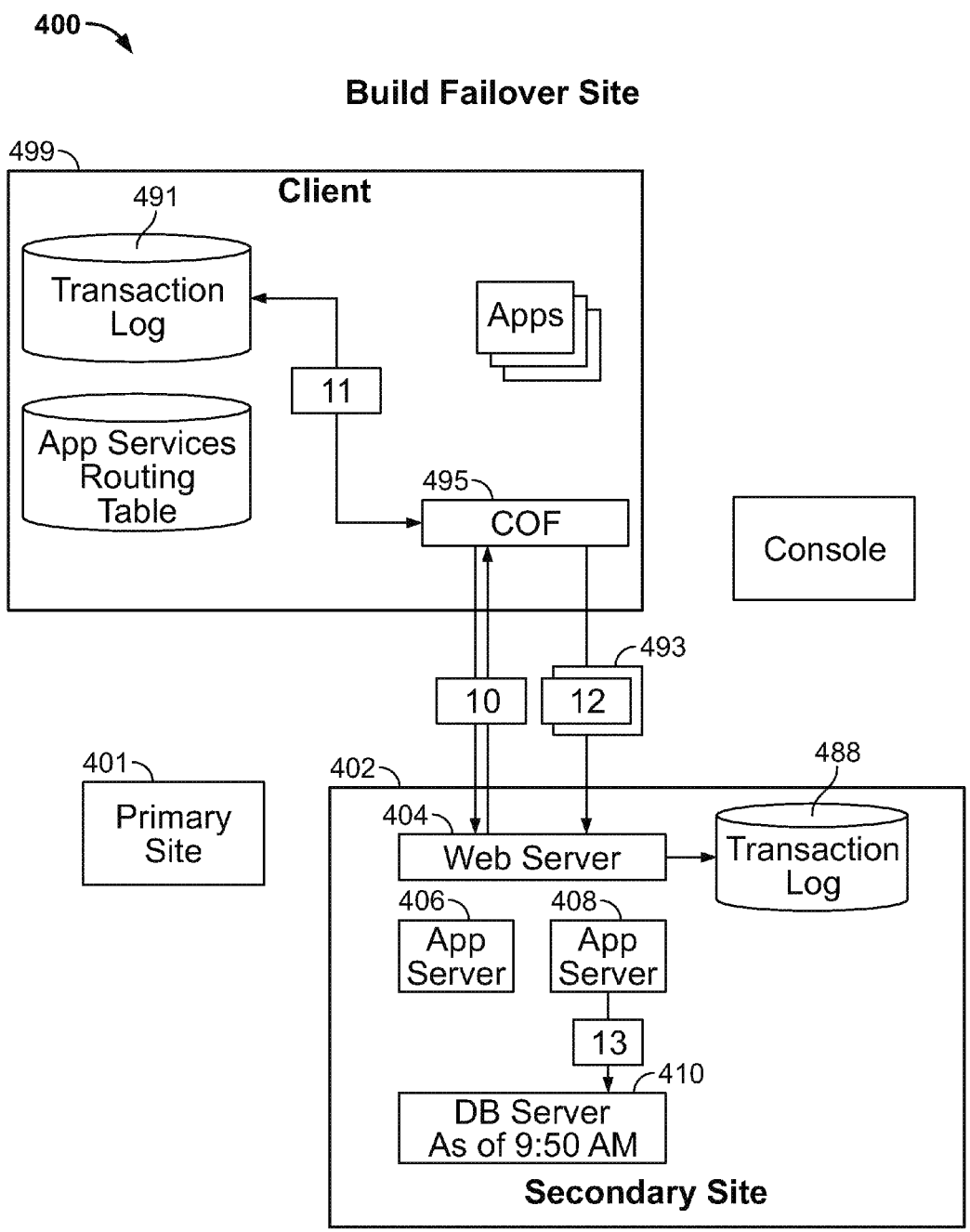
FIG. 4 illustrates an example resilient client architecture system with a build failover site.

FIG. 4 shows an example manner in which a failover site is built using the system 400. The COF 495 connects with secondary site 402 in block 10 and determines the currentness of the secondary site 402. As described above, the currentness of the secondary site 402 can be determined based upon the frequency in which data was offloaded from a primary site, such as primary site 401, to the secondary site 402. The COF 495 polls transaction log 491 in block 11 to determine if secondary site 402 is missing any transactions that are contained in the local transaction log 491. If the secondary site 402 is missing transactions, the COF 495 sends the missing transactions 493 in block 12 to web server 404 in chronological sequence.

In block 13, the secondary site 402 applies the missing transactions 493 by routing them from the web server 404 and application servers 406, 408 to database server 410. In a system 400 that consists of more than one active client 499, each client can failover to the secondary site at a different time as each client 499 tries to access the primary site 401 and fails at a different time. As each client 499 fails over to the secondary site 402 the secondary site 402 is rebuilt from the distributed transaction logs 491 at the client 499 as they failover to the secondary site. Because clients can failover at different times and in no predetermined order, transaction exceptions can occur when the distributed transaction logs 491 are processed. Transaction exceptions can be handled in a number of ways. For example, a change transaction or a delete transaction received prior to an add transaction can manifest as a group identifier (GID) not found. The system 400 can then direct secondary site 402 to store the change transaction or delete transaction in a pending queue and register interest in the missing GID.

If a change transaction is received out of order, the result can appear as an old value on the transaction 493 not equaling an old value on the database 410. The system 400 then directs secondary site 402 to check the time stamps of the change transaction. If the time stamp on the change transaction is earlier than the latest applied transaction for that GID, then the change transaction is discarded. If the time stamp on the change transaction is not earlier than the latest applied transaction for that GID, then the change transaction is applied. The timestamp corresponding to the current value on the database 410 is resolved by checking the local transaction log 488 to assess when the update to the database 410 was made. If the update on the transaction log 488 is not found—either because it was done prior to when the transaction log 488 was cleaned or by an overnight batch importer job—the system 400 assumes that the received change transaction 493 is more current than the database 410 and applies the change.

If a delete transaction is received out of order, this can also manifest as an old value on the transaction not equal to the old value on the database. In this case, however, the system will simply apply the transaction.

Figure 5:
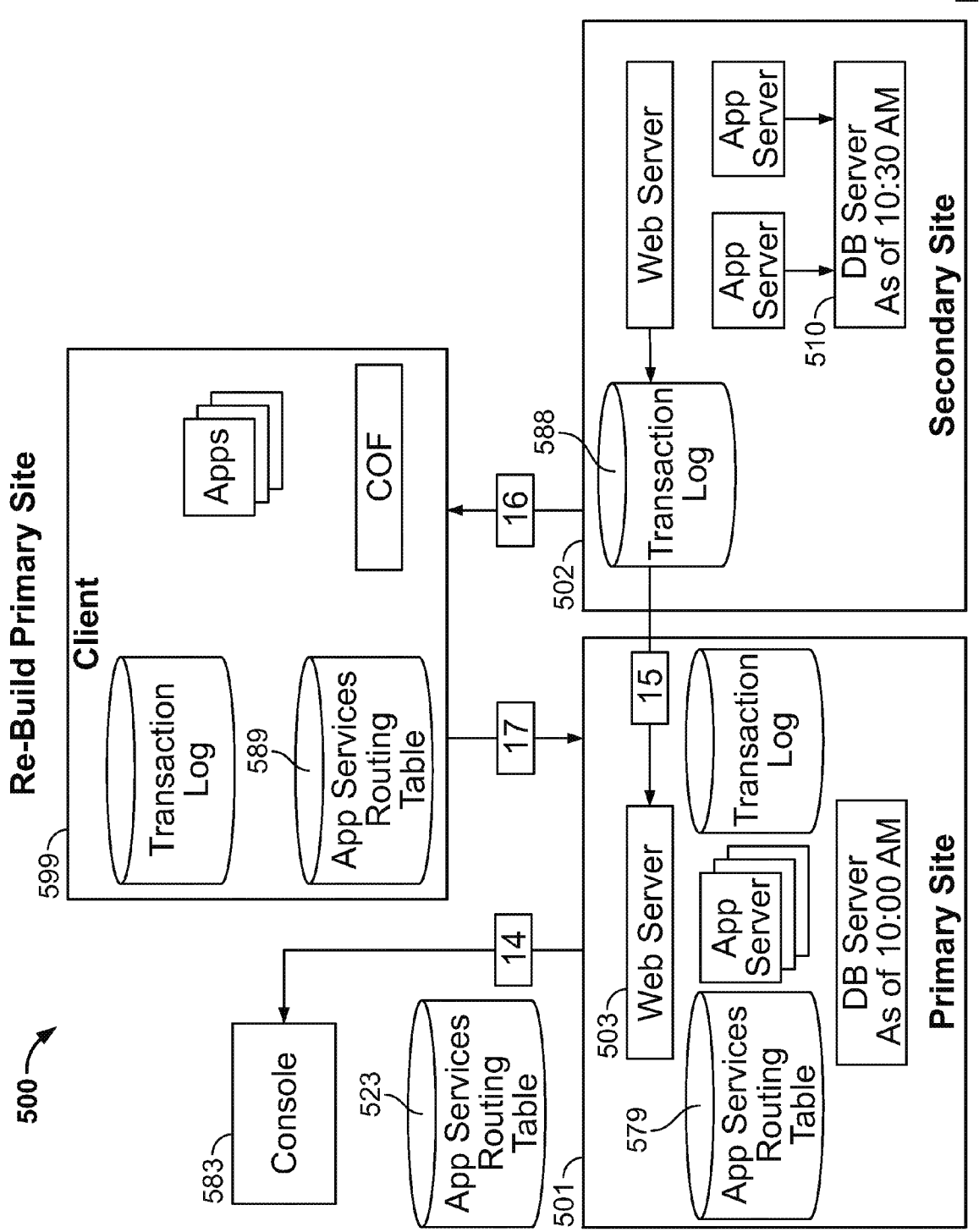
FIG. 5 shows an example resilient client architecture system with a primary site rebuild.

As shown in FIG. 5, once the failover site (secondary site 502) is built, the primary site 501 can be re-built. When the primary site 501 returns to on-line status, the system 500 can initiate a start up process to rebuild the primary site 501. As part of the start up process, primary site 501 queries the app services routing table 523 (on the console server 583) in block 14 to determine where the new master database is located. In one example, the new master database 510 is currently at the secondary site 502. Primary site 501 will check with console server 583 first, but if the console server 583 is not available or is otherwise unable to provide the location of the new master database, the primary site 501 will check other sites defined in its local copy of the app services routing table 579 to determine the location of the new master database.

Once the primary site 501 resolves to the new master database 510, the primary site 501 uses web server 503 to request all changes from the new master site (secondary site 502 in this example) from the point at which the primary site 501 went down or otherwise became unavailable. In block 15, web server 503 requests all changes from the transaction log 588 on the secondary site 502. The changes from the point at which the primary site 501 went down are determined from the last entry to the local transaction log 588 to the instant time at which the web server 503 requests the changes.

Once the primary site 501 has been restored and is fully current, the secondary site 502 continues to send changes to the primary site 501 to keep it current. Secondary site 502 then initiates a switch of the master site designation back to the primary site 501 in block 16 by updating the app service routing tables 589 and notifying all connected clients 599 to retry the primary site 501. Connected clients 599 then reconnect to the primary site 501 in block 17.

Figure 6:
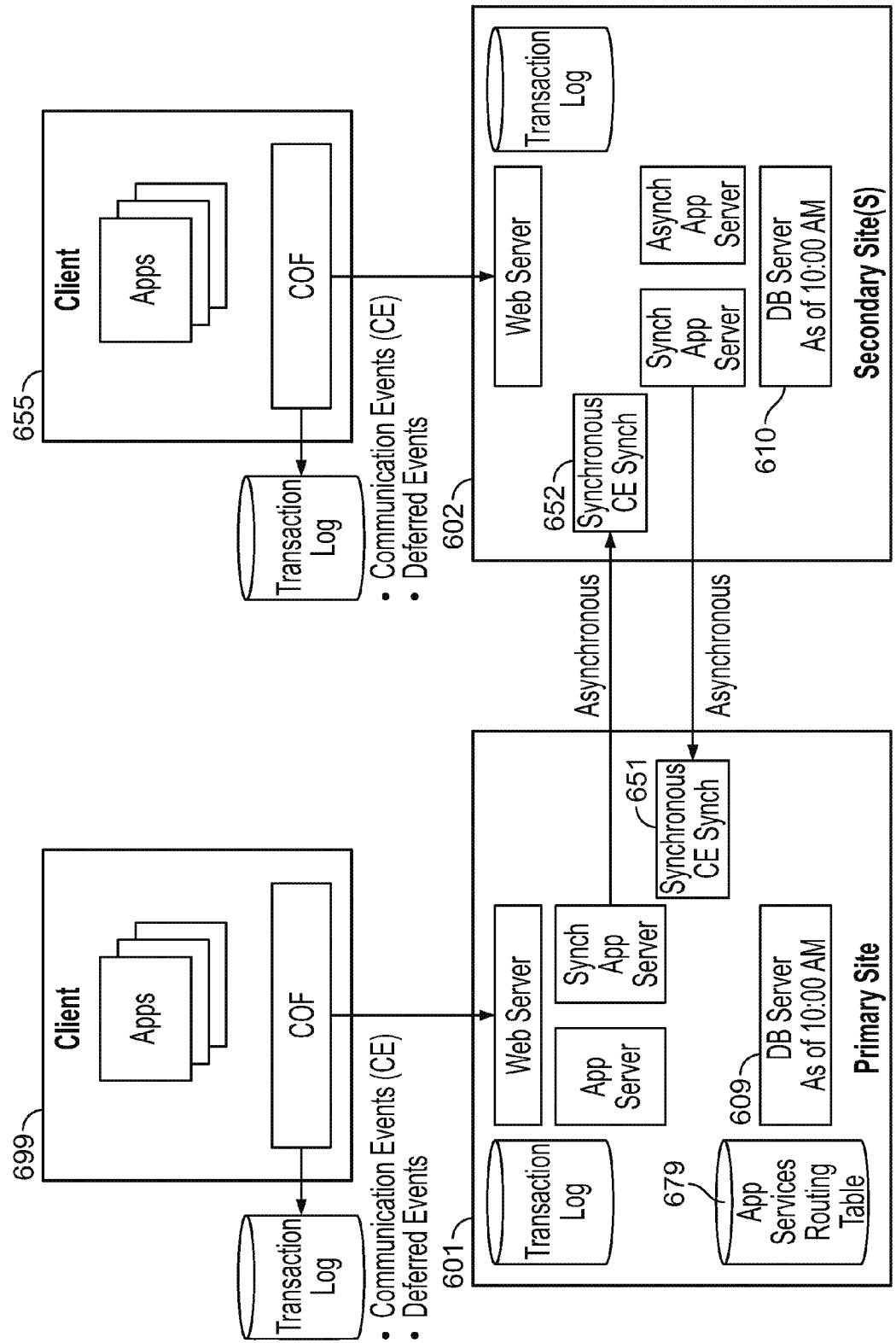
FIG. 6 shows an example resilient client architecture system with an active secondary site architecture.

FIG. 6 illustrates an example system configuration with active secondary site architecture. In an advanced configuration such as in system 600, instead of having a primary site where all users connect and a secondary site that is used only when a service failure occurs, users are connected to all sites 601, 602 in the network system 600, thereby spreading the user load across more than one site. This type of configuration is useful in a network of more than two sites, because less "standby" capacity is required. That is, fewer "backup" sites or servers are required because all users are connected to all sites, and failovers can occur to any of the connected servers and/or sites. For example, in a network of ten sites, an application could have 20% extra capacity (2 extra sites) and load all users across all ten sites. Then, up to two sites could fail, and the users would be automatically redistributed across the remaining eight sites with no loss of capacity or diminishment of the user experience. To achieve the same result with a primary/secondary site orientation (as discussed above in the examples of FIGS. 1-5) would require sixteen sites—eight primary and eight secondary. An active secondary site architecture approach has added value in that sites can be located in areas close to end users to reduce message latency and to isolate sites from risks such as natural and man-made disasters.

To effectively implement an active secondary site architecture, such as the example depicted as system 600 in FIG. 6, the sites 601, 602 and the clients 699, 655 need to be kept very close to being synchronous. When a user updates one client site to which he is connected then the remaining sites (nine of them in this active secondary site architecture example) should be updated via an asynchronous update process so that they stay in near-time synchronization with all other the other sites. This drives inter site message traffic as one application data change needs n messages sent and processed where n=the number of sites. As such, this approach is well-suited for applications that are read oriented with relatively few updates relative to reads.

In FIG. 6, client 699 is connected to site 601 and client 655 is connected to site 602, and each client 699, 655 is making changes to its own database. The changes are processed as discussed in FIGS. 1-5, but after the changes are posted to the respective local databases 609, 610, the changes are routed to all other sites through a dedicated asynchronous process 651, 652. For example, when client 699 makes a change to data or applications in its own database, the change is sent to the primary site 601 as a synchronous update. Primary site 601 consults a local copy of the application services routing table 679 to determine other sites (such as secondary site 602) to which an update must be sent. The update to secondary site 602 is sent asynchronously to synchronous CE Synch process 652, which is then used by secondary site 602 to effect the update. Similarly, when updates are made by client 655, secondary site 602 routes the update to primary site 601 via a similar asynchronous process 651. Due to asynchronous processing queues and delays, transactions may be processed out of order and will be resolved in the same fashion as described above with regard to FIG. 4.

Figure 7:
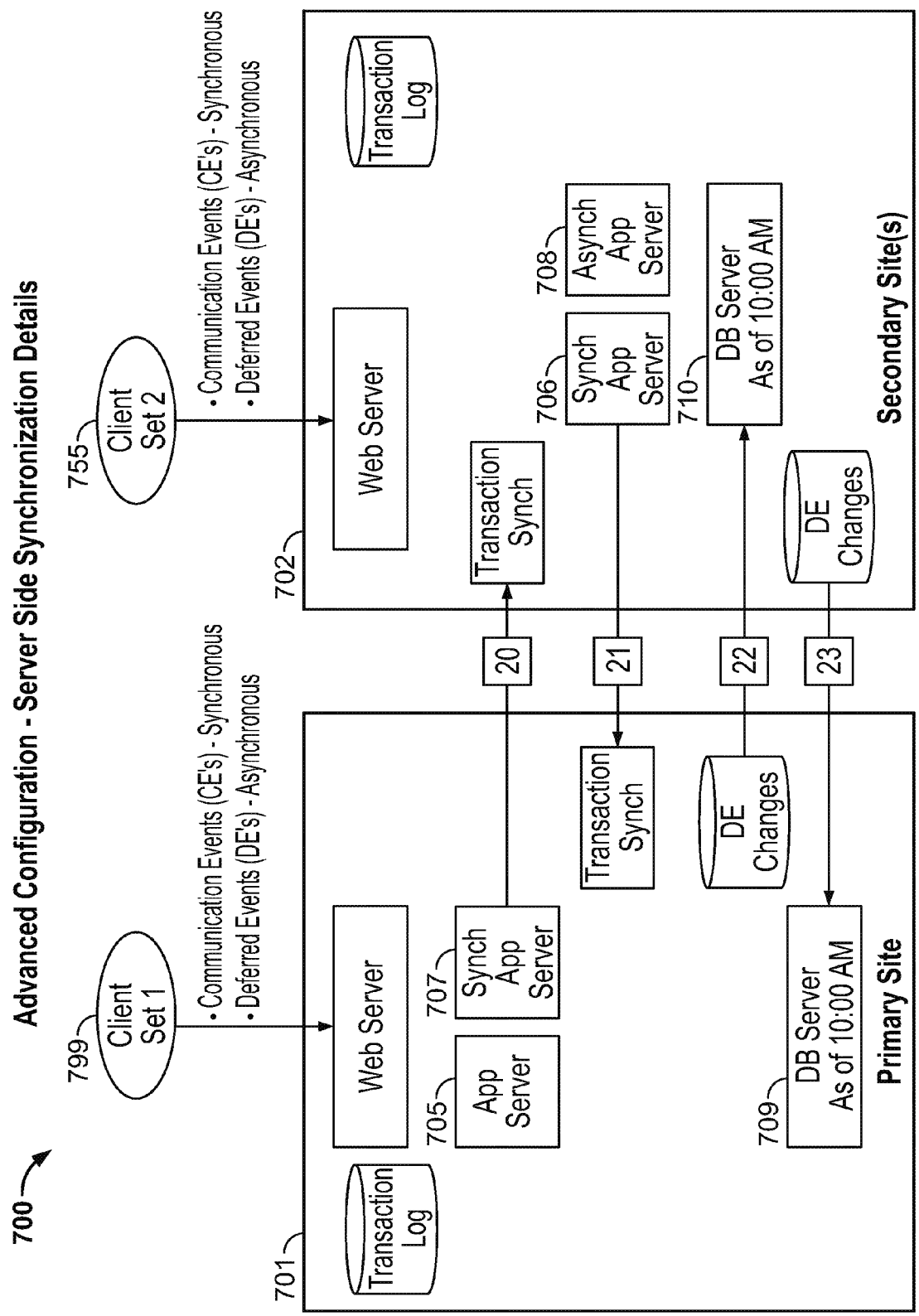
FIG. 7 illustrates an example resilient client architecture system with server side synchronization.

FIG. 7 shows an example configuration of system 700 showing server side synchronization details where each site 701, 702 services a unique set of clients 799, 755. The updates from each site 701, 702 are propagated to the other sites. Synchronous and asynchronous update transactions shown in blocks 20 and 21 are propagated at the application layer with application servers 705, 706, 707, 708 through a transaction synchronization process. For example, a synchronous transaction 20 is applied by the receiving site 702 as if the transaction 20 had been submitted locally. Likewise, transaction 21 is applied by site 701 as if the transaction 21 had been submitted locally.

In one example system 700, asynchronous update transactions lock down portions of the application to be updated. This is of importance when an application needs to perform a large update process, such as a request to update securities position values with end of day closing prices for hundreds of thousands of positions, for example. In this case, prior to processing this large batch update, the impacted parts of the data base 709, 710 are locked on all sites 701, 702 using transaction blocks 20 and 21. That is, asynchronous update transactions use a pessimistic application layer locking model that blocks operations of the transaction if they can cause a violation of integrity rules. Integrity rules can include properties that guarantee database transactions are processed reliably. For example, the properties may include atomicity, consistency, isolation, and durability. Once the asynchronous transactions are complete, database servers 709, 710 propagate the results of the asynchronous updates at the data base layer as shown in blocks 22 and 23 and release the remote application layer locks and return control to the submitting site.

Figure 8:
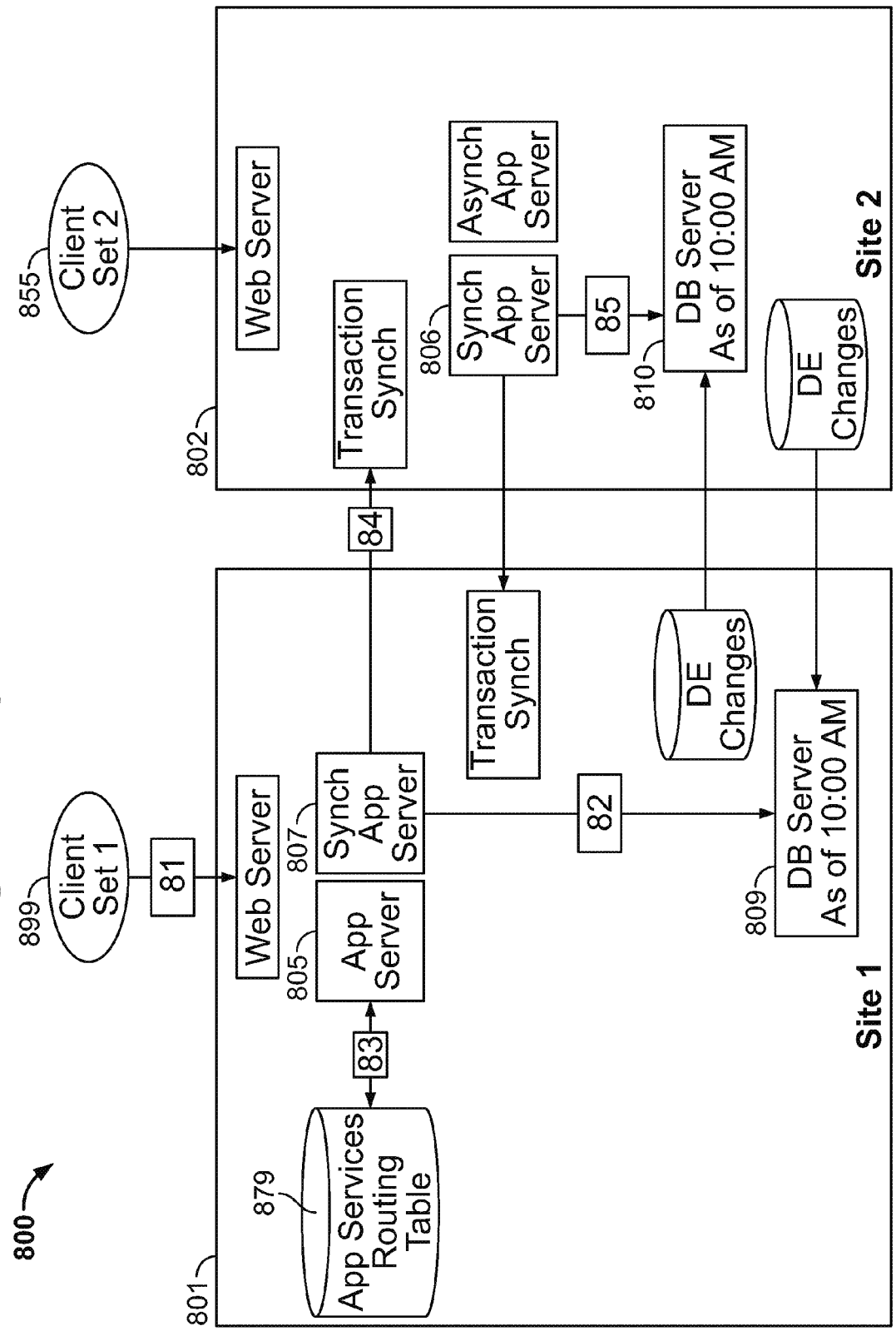
FIG. 8 illustrates an example resilient client architecture system with synchronous event process details.

FIG. 8 shows an example configuration of system 800 showing synchronous event process details where each site 801, 802 services a unique set of clients 899, 855. System 800 can be employed when an update or change to a first site is made by one (set of) client(s) and the update or change needs to be implemented on a second site. For example, a synch update is made by client 899 in block 81, and the update transaction is passed to site 801. In block 82, the synch update is applied by the application server 807 to the database server 809 at site 801 and the client transaction is completed. In block 83, application server 805 determines synch update propagation instructions from app services routing table 879. In block 84, the synch update is sent by application server 807 to distributed sites, such as site 802.

Distributed site 802 receives the distributed synch update 84 and uses application server 806 to apply it to the distributed data base 810 in block 85. If the distributed site data base 810 detects a conflict, the conflict can be resolved in a number of ways depending upon the type of conflict detected as described above with regard to transaction exceptions and FIG. 4.

Figure 9:
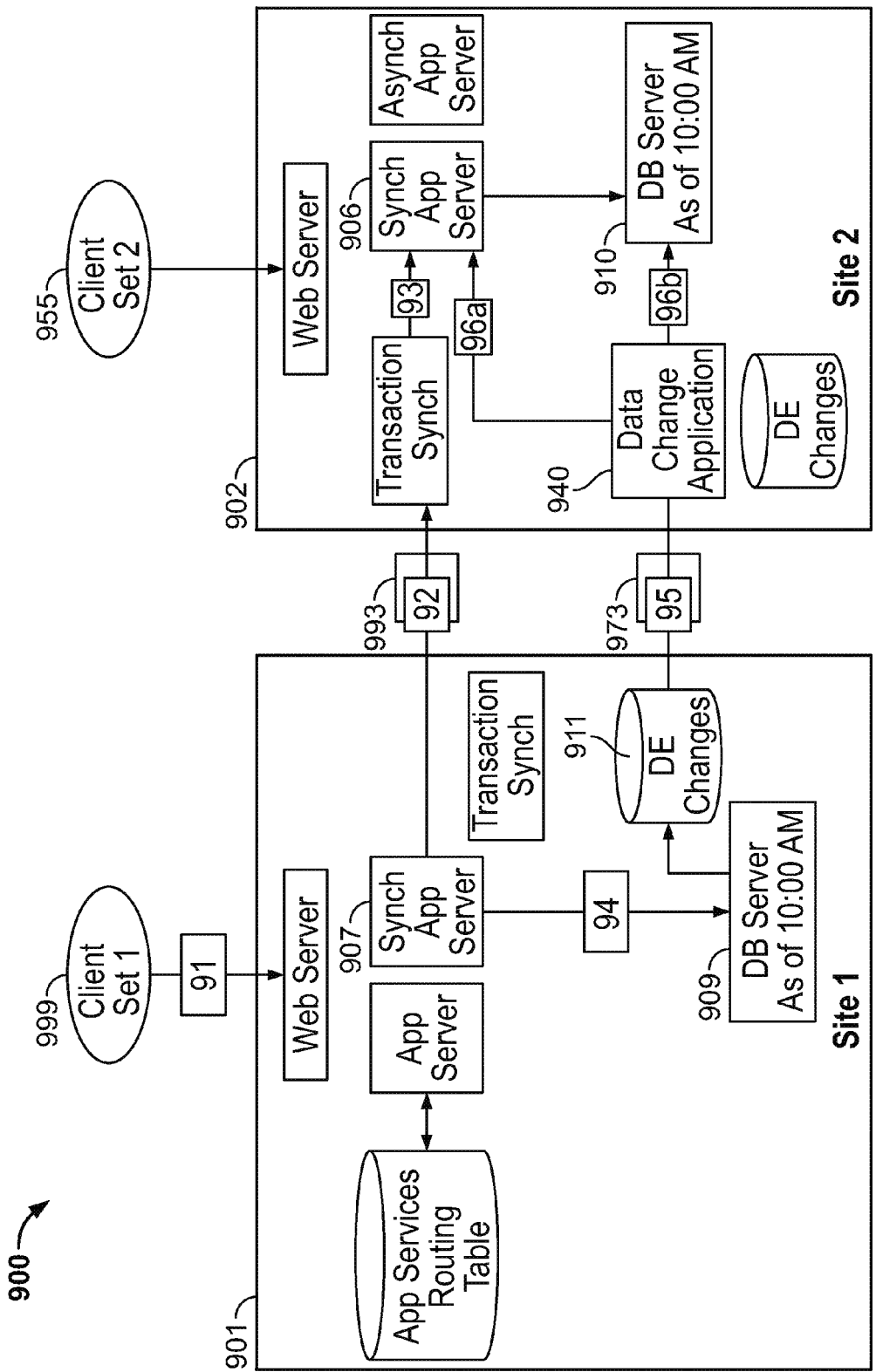
FIG. 9 illustrates an example resilient client architecture system with asynchronous update event process details.

FIG. 9 shows an example configuration of system 900 showing asynchronous event update process details where each site 901, 902 services a unique set of clients 999, 955. For example, an asynchronous update to be incorporated at all sites can include a commissions recalculation for a sales force. In such an example, it would be important to lock down all sites as the global asynchronous update is performed to avoid data conflicts. The lock is effected synchronously, and the application of the resulting data updates is performed asynchronously. For example, in block 91, an asynch update is made by a client in client set 999 and passed to site 901. In block 92, site 901 uses application server 907 to pass the deferred event notification 993 to the distributed sites, such as site 902. In block 93, the distributed site 902 uses application server 906 to lock the application functions that can update data so that the site 902 can be updated by the asynch update transaction 993 (target data). The site 902 then returns a lock complete message to the originating site 901 (return lock block not shown).

In block 94, the originating site 901 uses application server 907 and runs the asynch update transaction (DE, or "deferred event") on the database server 909 and logs the data changes to a deferred event data change log 911. After the data change is logged, in block 95 the originating site 901 uses data change log 911 and sends the deferred event 973 (DE) changes to the distributed site 902. In blocks 96a and 96b, data change application 940 applies the changes to the database server 910 and unlocks application components in application server 906 to effect the changes to distributed site 902.

To prevent a deadly embrace when two asynch update requests are made on two different sites, the originating site will check the local transaction log to see if any competing asynch update transactions are running Conflicts detected at this stage will be resolved by the user. If a distributed site receives an asynch update request that conflicts with one already in process on the local transaction log, it will return a fail message to the lock request. All asynch update requests must get success messages from all distributed sites prior to beginning execution.

A further example of the processing described in FIG. 9 is the commission calculation for a set of end user sales persons. Commissions calculation is typically a computationally intense process that is run in batch in off hours to minimize impact to other online users. In this example, the system will recalculate commissions for all users. The users are connected to multiple sites. First, a commissions recalculation request is made (block 91) to a site, which then has to signal all other sites that a commissions recalculation update will be run (block 92). Each remote site will receive this message and lock all data that is potentially updated by the commissions process (block 93). This lock is an application level lock that prevents users from changing data that will be changed by the batch commissions recalculation process. When each remote site responds that the locks are in place (the return lock block is not shown separately), the commissions recalculation will take place on the site on which the original commissions recalculation request was made and the results will be stored as a batch of data base changes (block 94). When the commissions recalculation is complete, the data base updates are sent to the remote sites (block 95) and applied (block 96b). Once each site has applied the data base changes, the application level locks at that site are released (block 96a).

As outlined above, each of the client computers, sites, and servers can include a central processing unit (CPU), controller or processor, a memory, and an interface system which are coupled together by a bus or other link, although other numbers and types of each of the components and other configurations and locations for the components can be used. The processors in the client computers, the servers, and the sites can execute a program of stored instructions for one or more aspects of the methods and systems as described herein, although the processor could execute other types of programmed instructions. The memory can store these programmed instructions for one or more aspects of the methods and systems as described herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, can be used for the memory. The user input device can include a computer keyboard and a computer mouse, although other types and numbers of user input devices can be used. The display can include a computer display screen, such as a CRT or LCD screen by way of example only, although other types and numbers of displays could be used.

Although an example of the client computers 199, sites 101, 102, and servers are described and illustrated in connection with FIG. 10, each of the computers and computing devices of the system 100 could be implemented on any suitable computer system or computing device. It is to be understood that the example devices and systems of the system 100 are for exemplary purposes, as many variations of the specific hardware and software used to implement the system 100 are possible, as will be appreciated by those skilled in the relevant art(s).

Further, each of the devices of the system 100 can be conveniently implemented using one or more general purpose computer systems, microprocessors, digital signal processors, micro-controllers, application specific integrated circuits (ASIC), programmable logic devices (PLD), field programmable logic devices (FPLD), field programmable gate arrays (FPGA) and the like, programmed according to the teachings as described and illustrated herein, as will be appreciated by those skilled in the computer, software, and networking arts.

The operation of example processes to provide a client failover synchronization shown in FIGS. 1-9 can be run on the network system 100. The flow diagrams of FIGS. 1-9 are representative of example machine readable instructions for implementing the failover synchronization and/or the process to determine data transmission failure and activate loss controls. The steps described below are example machine readable instructions for implementing a method in accordance with the examples described in this disclosure. In one example, the machine readable instructions include an algorithm for execution by: (a) a processor, (b) a controller, and/or (c) one or more other suitable processing device(s). The algorithm can be instantiated in software stored on tangible media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or embodied in firmware or in dedicated hardware in a known manner. For example, the algorithm can be implemented by an application specific integrated circuit (ASIC), a programmable logic device (PLD), a field programmable logic device (FPLD), a field programmable gate array (FPGA), discrete logic, etc.). For example, any or all of the components of the failover synchronization system could be implemented by software, hardware, and/or firmware. Also, some or all of the machine readable instructions described herein can be implemented manually. Further, although an example of the present invention is described and illustrated herein, persons of ordinary skill in the art will readily appreciate that many other methods of implementing the example machine readable instructions can alternatively be used. For example, the order of execution can be changed, and/or some of the steps described can be changed, eliminated, or combined.

By performing a failover synchronization method using a system described above, if a primary site fails or is unavailable, the failover to the secondary site(s) is accomplished seamlessly without interruption to the client.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as can be specified in the claims. Accordingly, the invention is limited only by the following claims and equivalents thereto.

What is claimed is:

1. A computer-implemented resilient client failover method to maintain an up-to-date shared application service, the method comprising:
   determining, with an intelligent client computer, a level of data currentness of a primary site;
   detecting, with the intelligent client computer, that the primary site is unavailable;
   assessing, with the intelligent client computer, a level of data currentness of a secondary site;
   determining, with the intelligent client computer, updates made by the intelligent client computer to data that have not been sent to the secondary site based upon the level of data currentness of the secondary site, wherein determining includes:
      polling a local transaction log of the intelligent client computer; and
      identifying a serialized transaction in the local transaction log that is missing from the secondary site, the serialized transaction including updates made by the intelligent client computer to data for updating the primary site; and
   replaying, by the intelligent client computer, the updates to the data made by the intelligent client computer to the secondary site, wherein replaying includes,
      sending the missing serialized transaction to the secondary site;
      updating the secondary site with the missing serialized transaction; and
      posting a copy of the serialized transaction to a server side transaction log on the secondary site.

2. The method of claim 1 further comprising:
   establishing a time standard between the primary site and the secondary site to determine the data currentness of the secondary site; and
   synchronizing the primary site and the secondary site based upon the established time standard.

3. The method of claim 1, wherein the primary site includes at least one of a web server, an application server, or a database server.

4. The method of claim 1, wherein the secondary site includes at least one of a web server, an application server, or a database server.

5. The method of claim 1, wherein the updates to data include at least one of a client request, an application service request, or an update to a data field.

6. The method of claim 1, wherein assessing the data currentness of the secondary site includes determining the most recent time synchronization of the secondary site to the primary site.

7. The method of claim 1, wherein the data currentness of the primary site is determined by the date and time of a most recent successful update by the intelligent client computer to a persistent data store on the primary site.

8. The method of claim 1 further comprising:
   storing the updates to the primary site data made by the intelligent client in a transaction log of the intelligent client.

9. The method of claim 8, wherein the updates replayed to the secondary site are performed prior to posting transactions or performing read operations on the secondary site.

10. The method of claim 1, wherein the primary site and the secondary site reside in the same computing device.

11. The method of claim 1, wherein the primary site and the secondary site reside in separate computing devices.

12. The method of claim 1, wherein replaying the updates to the secondary site further comprises:
   tracking the updates in an application service routing table of the intelligent client to determine the primary site and at least one eligible secondary site; and
   rerouting client updates to the at least one eligible secondary site upon determining that the primary site is unavailable.

13. The method of claim 12, wherein the secondary site receiving the rerouted client updates is selected based upon at least one of data currentness of eligible secondary sites, network traffic characteristics, and network capacity.

14. The method of claim 1, wherein detecting that the primary site is unavailable includes at least one of detecting a service tier failure, an application tier failure, or a database failure.

15. The method of claim 1 further comprising:
requesting, by the intelligent client computer, transaction services from a client object factory;
storing the updates made by the intelligent client computer as the serialized transaction in the local transaction log;
posting the serialized transaction in the local transaction log;
determining the secondary site based upon an application services routing table;
replaying the serialized transaction to the determined secondary site when the intelligent client computer determines that the primary site is unavailable;
servicing the requested transaction by the secondary site;
receiving a transaction response from the secondary site; and
delivering, by the client object factory, a transaction services response to the intelligent computer.

16. A non-transitory computer readable storage media for maintaining an up-to-date shared application service, the computer readable storage media comprising one or more computer-readable instructions configured to cause one or more computer processors to execute operations comprising:
determining, with an intelligent client computer, a level of data currentness of a primary site;
detecting, with the intelligent client computer, that the primary site is unavailable;
assessing, with the intelligent client computer, a level of data currentness of a secondary site;
determining, with the intelligent client computer, updates made by the intelligent client computer to data that have not been sent to the secondary site based upon the level of data currentness of the secondary site, wherein determining includes:
polling a local transaction log of the intelligent client computer; and
identifying a serialized transaction in the local transaction log that is missing from the secondary site, the serialized transaction including updates made by the intelligent client computer to data for updating the primary site; and
replaying, by the intelligent client computer, the updates to the data made by the intelligent client computer to the secondary site, wherein replaying includes,
sending the missing serialized transaction to the secondary site;
updating the secondary site with the missing serialized transaction; and
posting a copy of the serialized transaction to a server side transaction log on the secondary site.

17. The non-transitory computer readable storage media of claim 16 further comprising computer-readable instructions configured to cause one or more computer processors to execute the operations comprising:
storing the updates to the primary site data made by the intelligent client in a transaction log of the intelligent client.

18. The non-transitory computer readable storage media of claim 16, wherein the computer-readable instructions configured to cause one or more computer processors to execute the operations for replaying the updates to the secondary site further comprises computer-readable instructions configured to cause one or more computer processors to execute the operations comprising:
tracking the updates in an application service routing table of the intelligent client to determine the primary site and at least one eligible secondary site; and
rerouting client updates to the at least one eligible secondary site upon determining that the primary site is unavailable.

19. The non-transitory computer readable storage media of claim 16, wherein detecting that the primary site is unavailable includes at least one of detecting a service tier failure, an application tier failure, or a database failure.

20. The non-transitory computer readable storage media of claim 16, further comprising computer-readable instructions configured to cause one or more computer processors to execute the operations comprising:
requesting, by the intelligent client computer, transaction services from a client object factory;
serializing as a transaction, by the client object factory, updates made by the intelligent client computer to data for updating the primary site;
storing the updates made by the intelligent client computer as the serialized transaction in the local transaction log;
posting the serialized transaction in the local transaction log;
determining the secondary site based upon an application services routing table; and
replaying the transaction to the secondary site when the intelligent client computer determines that the primary site is unavailable;
servicing the requested transaction by the secondary site;
receiving a transaction response from the secondary site; and
delivering, by the client object factory, a transaction services response to the intelligent computer.

21. An intelligent client computer device configured to implement a resilient client failover to maintain an up-to-date shared application service, the intelligent client computer device comprising:
a system memory, wherein the system memory includes a client object factory;
the client object factory configured to determine a level of data currentness of a primary site; and
a link to a control console storing a latest copy of an application services routing table, the intelligent client computer device configured to detect that the primary site is unavailable by accessing the application services routing table;
a local transaction log that stores serialized transactions including updates made by the intelligent client computer to data for updating the primary site;
wherein the client object factory is further configured to assess a level of data currentness of a secondary site and to determine updates made by the intelligent client computer to data that have not been sent to the secondary site based upon the level of data currentness of the secondary site, wherein determining the updates includes:
polling the local transaction log; and
identifying a serialized transaction in the local transaction log that is missing from the secondary site; and
wherein the client object factory is further configured to replay the updates to the data made by the intelligent client computer to the secondary site wherein replaying the updates includes:
sending the missing serialized transaction to the secondary site;

updating the secondary site with the missing serialized transaction; and posting a copy of the serialized transaction to a server side transaction log on the secondary site.

22. The intelligent client computer device of claim 21, wherein the client object factory is further configured to store the updates to the primary site data made by the intelligent client computer device in a transaction log.

23. The intelligent client computer device of claim 21 further comprising:

an application service routing table configured to track the updates to determine the primary site and at least one eligible secondary site and to reroute the updates to the at least one eligible secondary site upon determining that the primary site is unavailable.

24. The intelligent client computer device of claim 21, wherein the control console is further configured to detect that the primary site is unavailable by detecting at least one of a service tier failure, an application tier failure, or a database failure.

25. The intelligent client computer device of claim 21, wherein the client object factory is further configured to:

request transaction services;

store the updates made by the intelligent client computer as the serialized transaction in the local transaction log;

post the serialized transaction in the local transaction log;

determine the secondary site based upon an application services routing table;

replay the serialized transaction to the determined secondary site when the control console determines that the primary site is unavailable; and receive a transaction response from the secondary site when the secondary site services the serialized transaction.

26. A computer-implemented resilient client update method using an active secondary site, the method comprising:

determining, with an intelligent client computer, a level of data currentness of a primary site;

determining, with the intelligent client computer, updates made by the intelligent client computer to data that have not been sent to the primary site, wherein determining includes:

polling a local transaction log of the intelligent client computer; and identifying a serialized transaction in the local transaction log that is missing from the primary site, the serialized transaction including updates made by the intelligent client computer to data for updating the primary site; and synchronously posting, with the intelligent client computer, the updates made by the intelligent client to the primary site;

assessing, with the intelligent client computer, a level of data currentness of a secondary site; and asynchronously routing the updates to the data made by the intelligent client computer from the primary site to the secondary site, wherein asynchronously routing includes:

the primary site consulting a local copy of an application services routing table;

determining a secondary site to which the updates will be sent based upon the application services routing table;

sending the updates to the determined secondary.

* * * * *